(12) United States Patent  (10) Patent No.: US 8,203,237 B1
Cowles  (45) Date of Patent: Jun. 19, 2012

(54) PORTABLE POWER GENERATING UNIT

(76) Inventor: Scott R. Cowles, San Francisco, CA (US)

( * ) Notice: Subject to any disclaimer, the term of this patent is extended or adjusted under 35 U.S.C. 154(b) by 282 days.

(21) Appl. No.: 12/688,233

(22) Filed: Jan. 15, 2010

Related U.S. Application Data (60) Provisional application No. 61/205,073, filed on Jan. 15, 2009.

(51) Int. Cl.
H02J 7/00 (2006.01)
(52) U.S. Cl. .................................. 307/150
(58) Field of Classification Search .................. 307/150
See application file for complete search history.

(56) References Cited

U.S. PATENT DOCUMENTS

| | | |
|---|---|---|
| 4,009,051 A | 2/1977 | Kazis et al. |
| 4,122,396 A | 10/1978 | Grazier et al. |
| 4,209,346 A | 6/1980 | King |
| 4,274,044 A | 6/1981 | Barre |
| 4,421,943 A | 12/1983 | Withjack |
| 4,808,904 A | 2/1989 | Ricaud et al. |
| 5,111,127 A | 5/1992 | Johnson |
| 5,522,943 A | 6/1996 | Spencer et al. |
| 5,793,184 A | 8/1998 | O'Connor |
| 5,905,356 A | 5/1999 | Wells |
| 5,969,501 A | 10/1999 | Glidden et al. |
| 6,262,558 B1 * | 7/2001 | Weinberg ................ 320/101 |
| D467,225 S | 12/2002 | Sudo |
| 7,095,213 B2 | 8/2006 | Weng |
| 7,598,856 B1 * | 10/2009 | Nick et al. ............ 340/539.13 |
| 7,898,212 B2 * | 3/2011 | Benn et al. .............. 320/101 |
| 2009/0230783 A1 * | 9/2009 | Weed et al. ............. 307/150 |

* cited by examiner

*Primary Examiner* — Robert L. DeBeradinis
(74) *Attorney, Agent, or Firm* — Montgomery Patent & Design, LLC; Robert C. Montgomery; Joseph T. Yaksich (57) ABSTRACT

A portable power generating unit charged by an on-board solar panel is herein disclosed, capable of operating small electrical devices for extended periods of time. A solar cell panel is provided on an adjustable arm which swings up from a rectangular enclosure and is capable of being positioned so as to receive a maximum amount of solar energy. Output power from the solar panel is used to charge an internal battery through a charge controller. Power from the battery is conducted thereto a plurality of ports, each comprising an integral voltage regulator, thereby supplying different standard voltages to the ports. Such features allow the portable power generating unit to be used in an outdoor setting to operate electrical devices where conventional electrical outlets are unavailable. The portable power generating unit further comprises a personal locator beacon (PLB) and a flashing strobe light to locate and rescue a user in an emergency situation if required.

15 Claims, 4 Drawing Sheets

PORTABLE POWER GENERATING UNIT

RELATED APPLICATIONS

The present invention was first described in and claims the benefit of U.S. Provisional Patent No. 61/205,073 filed Jan. 15, 2009, the entire disclosures of which are incorporated herein by reference.

FIELD OF THE INVENTION

The present invention relates generally to solar cell power supplies, and in particular, to an apparatus for the collection, control, and selective distribution of solar energy for use in powering common electronic devices.

BACKGROUND OF THE INVENTION

Enjoying the outdoors remains a popular pastime. A variety of activities from camping to hunting to hiking involve extended periods spent away from the accoutrements of modern life. During such long amounts of time spent away from home, many people are inclined to take with them common electronics which provide them with entertainment and conveniences such as music players, cell phones, computers, and the like.

A common problem encountered over long periods of time spent away from the usual comforts is that of powering such electronic devices. Batteries are expensive and provide limited capacity for power over an extended period, and devices such as generators can be cumbersome or uncomfortable to utilize. The use of solar cells is often considered to be a viable source of energy in such remote locations, allow such solar generating devices are unwieldy and unsuited to use with such electronics.

Various attempts have been made to provide a solar powered power supply. Examples of these attempts can be seen by reference to several U.S. patents. U.S. Pat. No. 4,122,396, issued in the name of Grazier et al., describes a solar power source for portable electrical devices. The Grazier apparatus provides controlling capabilities for providing a stable electrical voltage.

U.S. Pat. No. 5,522,943, issued in the name of Spencer et al., describes a portable solar power supply. The Spencer apparatus provides solar cell panels with an electrical power cord output.

U.S. Pat. No. 7,095,213, issued in the name of Weng, describes a multifunctional complex power supply device. The Weng apparatus provides electrical generation capabilities from both solar power and sound.

Additionally, ornamental designs for a portable solar power supply exist, particularly U.S. Pat. No. D 467,225. However, none of these designs are similar to the present invention.

While these apparatuses fulfill their respective, particular objectives, each of these references suffer from one (1) or more of the aforementioned disadvantages.

Many such apparatuses are cumbersome to transport. Also, many such apparatuses do not provide a variety of power outputs for both DC and AC power of varying voltages. In addition, many such apparatuses do not provide integral means for securely adjusting the positioning of the solar cells. Furthermore, many such apparatuses do not include an integral functionality, safety features, or data monitoring. Accordingly, there exists a need for a portable solar energy collection and distribution apparatus without the disadvantages as described above. The development of the present invention substantially departs from the conventional solutions and in doing so fulfills this need.

SUMMARY OF THE INVENTION

In view of the foregoing references, the inventor recognized the aforementioned inherent problems and observed that there is a need for a means to provide a portable solar energy collection and distribution apparatus which is capable of providing power of a variety of types and levels to electronic devices and which includes internal safety features, adjustment mechanisms, and a variety of power adapters. Thus, the object of the present invention is to solve the aforementioned disadvantages and provide for this need.

To achieve the above objectives, it is an object of the present invention to comprise a portable power source charged by a solar array panel and capable of operating small electrical devices. The panel is mounted to a rectangular plastic housing by an adjustable arm. The output current produced by the solar cells is used to charge an internal battery pack.

Another object of the present invention is to rout power from the battery pack to a plurality of output jacks which provide different voltages. The output jacks provide various adapters for both DC and AC power for electronic devices such as portable phones, music players, computers, USB devices, and the like.

Yet still another object of the present invention is to comprise the electronics housing of a mail overall enclosure which comprises a rugged plastic enclosure.

The housing further comprises a hinged handle mounted to an end portion for ease of carrying and transportation.

Yet still another object of the present invention is to further comprises an upper face portion of the housing of an elongated cylindrical beacon pole which may be selectively stored flat against the housing or pivoted upwards via a hinged joint. The hinged joint comprises a common positional securing mechanism such as a three-element axial hinging bracket or the like.

Yet still another object of the present invention is to comprise the beacon of a strobe light at an upper end portion which provides flashing illumination to aid in location of a user in an emergency situation.

Yet still another object of the present invention is to comprise a charge control panel, a plurality of output jacks, a 120 VAC outlet, and an auxiliary DC jack on a long side portion of the housing. The control panel provides a digital display of information received from a solar charge controller such as battery level, power generation level, operating mode information, and the like.

Yet still another object of the present invention is to comprise the solar charge controller of a means to condition and direct electrical power from the solar array panel to the battery.

Yet still another object of the present invention is for the output jacks to provide various standard voltages to power small electrical devices. Each output jack is controlled via an adjacent two-position ON/OFF switch. In a preferred embodiment, the jacks comprise conventional 6-volt jacks, 9-volt jacks, 12-volt jacks, and USB jacks in addition to a 120 VAC outlet.

Yet still another object of the present invention is to comprise a pair of hinged joints which provide a slight resistance to motion in order to allow a user to position the solar array manually. The joints allow the solar array to be raised and angled in virtually any position in order to efficiently receive solar rays and capture a maximum amount of solar energy.

Yet still another object of the present invention is to expose a beacon switch when the beacon pole is raised. The switch provides push-button activation of a strobe light and an emergency signal from an internal PLB. The PLB provides wireless communication with an established satellite location and rescue system in a conventional manner.

Yet still another object of the present invention is to further comprise the housing of a hollow interior space which provides protective attachment to electrical and electronic equipment necessary to the operation of the apparatus including the solar charge controller, the rechargeable battery pack, and a DC to VAC inverter. The solar array panel produces a variable voltage current which is conducted via wiring from the solar array panel through the arm and to the solar charge controller.

Yet still another object of the present invention is for the charge controller to provide a regulation means to received power to provide a constant 12-volt DC voltage to the battery and inverter.

Yet still another object of the present invention is comprise an overcurrent protection device to prevent accidental short circuits and a voltage regulator for each output jack to produce an appropriate output voltage for the corresponding jack.

Yet still another object of the present invention is to provide a method of utilizing the apparatus that provides a unique means of transporting the apparatus, positioning the solar panel array, viewing internal data regarding power generation, utilizing the apparatus to power a variety of objects, and providing simple security features which allow a third party to easily locate the user.

Further objects and advantages of the present invention will become apparent from a consideration of the drawings and ensuing description.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

| DESCRIPTIVE KEY |   |
|---|---|
| 10 | portable power generating unit |
| 15 | housing |
| 17 | foot |
| 20 | handle |
| 25 | solar array panel |
| 27 | solar cell |
| 30 | arm |

| DESCRIPTIVE KEY |   |
|---|---|
| 32 | arm storage slot |
| 35 | first hinged joint |
| 40 | second hinged joint |
| 45 | beacon pole |
| 47 | third hinged joint |
| 50 | strobe light |
| 52 | illumination |
| 55 | personal locator beacon (PLB) |
| 58 | retaining clip |
| 60 | charge control panel |
| 65 | output jacks |
| 70 | on/off switch |
| 75 | 120 VAC outlet |
| 77 | auxiliary DC jack |
| 80 | electrical device |
| 85 | 120 VAC powered device |
| 90 | solar charge controller |
| 95 | rechargeable battery pack |
| 100 | control cable |
| 102 | wiring |
| 105 | over-current protection device |
| 110 | voltage regulators |
| 115 | DC to 120 VAC inverter |
| 120 | beacon switch |
| 130 | solar ray |
| 140 | emergency signal |

DETAILED DESCRIPTION OF THE PREFERRED EMBODIMENT

The best mode for carrying out the invention is presented in terms of its preferred embodiment, herein depicted within FIGS. 1 through 4. However, the invention is not limited to the described embodiment and a person skilled in the art will appreciate that many other embodiments of the invention are possible without deviating from the basic concept of the invention, and that any such work around will also fall under scope of this invention. It is envisioned that other styles and configurations of the present invention can be easily incorporated into the teachings of the present invention, and only one particular configuration shall be shown and described for purposes of clarity and disclosure and not by way of limitation of scope.

The terms "a" and "an" herein do not denote a limitation of quantity, but rather denote the presence of at least one of the referenced items.

The present invention describes a portable power generating unit (herein described as the "apparatus") 10, which provides a portable power source charged by a solar array panel 25 and capable of operating small electrical devices for extended periods of time. The solar panel 25 is mounted thereto an adjustable arm 30 which swings upwardly therefrom a rectangular plastic housing 15 being capable of angular adjustment to allow maximum exposure of the solar cell portions 27 of the solar panel 25 to solar energy 130. An output current produced by the solar cells 27 is used to charge an internal rechargeable battery pack 95. The output of the battery pack 95 in turn provides power thereto a plurality of output jacks 65 which provide different voltages. The output jacks 65 provide a direct current (DC) to charge portable phones, operate personal music players, computers, USB-operated devices, and the like. Additionally, an internal inverter supplies 120-volt alternating current (VAC) via a conventional AC outlet 75. Such features allow the apparatus 10 to power electrical devices in an outdoor setting where connection to a conventional electrical outlet is unavailable. The apparatus 10 further comprises emergency safety equipment including a strobe light 50 and a personal locator beacon (PLB) 55 to aid in locating a user in an event of an emergency situation.

Figure 1:
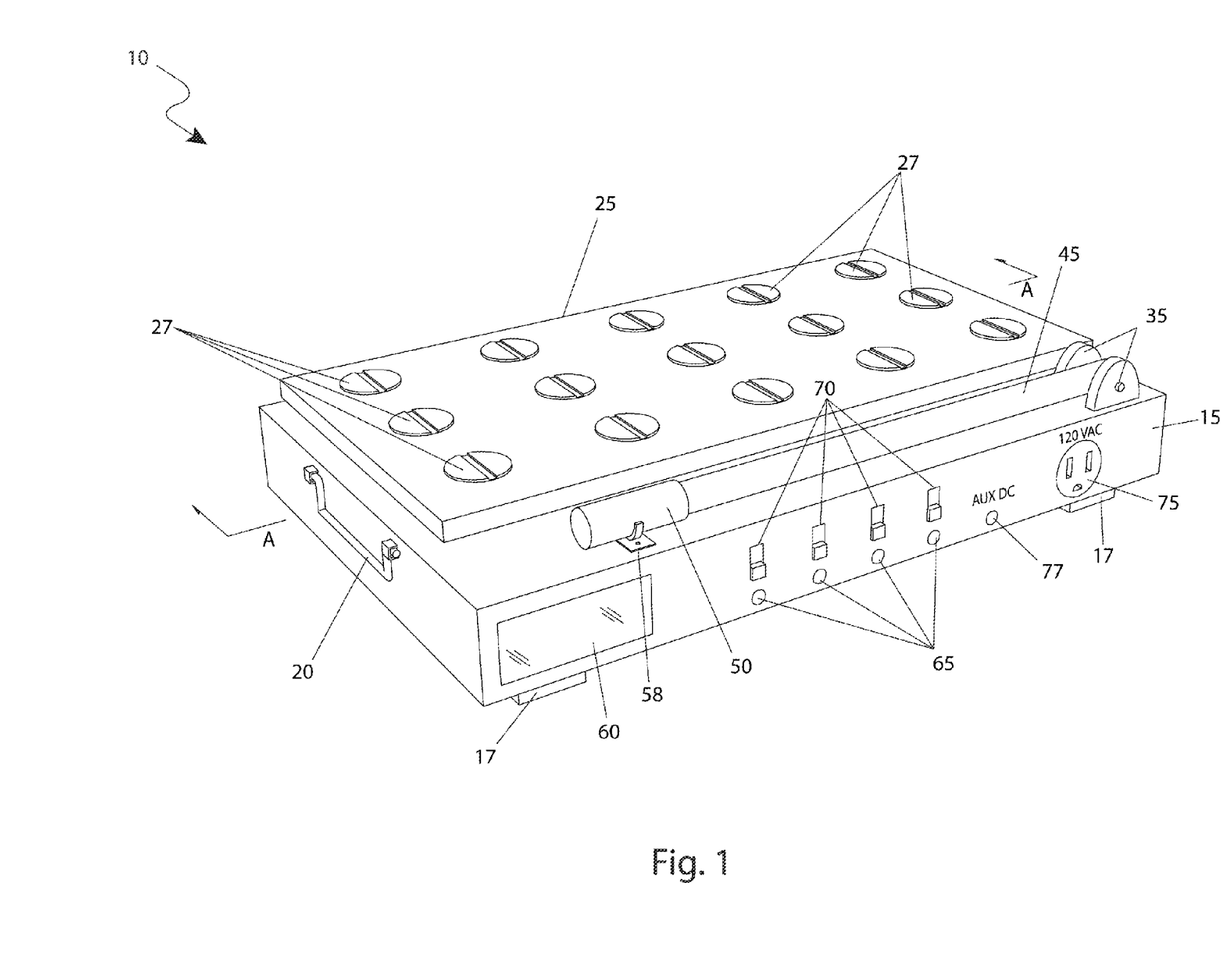
FIG. 1 is a perspective view of a portable power generating unit 10, shown in a stowed or non-utilized configuration, according to the preferred embodiment of the present invention.

Referring now to FIG. 1, a perspective view of the apparatus 10, shown in a stowed or non-utilized configuration, according to the preferred embodiment of the present invention, is disclosed. The apparatus 10 comprises an electronics housing 15 as a main overall enclosure having an overall size similar to that of a standard briefcase. The housing 15 comprises a rugged rectangular plastic enclosure envisioned being produced in a variety of colors and patterns using injection-molding or extruding processes common in the industry. The housing 15 comprises a hinged handle 20 mounted thereto an end portion to facilitate carrying and transporting of the apparatus 10 between locations. The housing 15 provides an attachment means thereto a solar array panel 25 having an approximate perimeter size as the housing 15, affixed thereto said housing 15 via an adjustable elevating arm 30, and stowed parallel and adjacent thereto said housing 15 along an exterior upper face (see FIG. 2).

Also located thereon the upper face portion of the housing 15, adjacent to the solar array panel 25, is an elongated cylindrical beacon pole 45 which is selectively stored flat against the housing or pivoted upwardly at a right angle. The beacon pole 45 is pivotally affixed thereto said housing 15 via a first hinged joint 35. The first hinged joint 35 comprises an integrally-molded three-element axial hinging bracket providing a slight resistance to motion, thereby retaining the beacon pole 45 therein a vertical position; however, other positional securing mechanisms may be provided utilizing various fasteners, tightening knobs, or the like to secure the beacon pole 45 with equal benefit, and as such should not be interpreted as a limiting factor of the apparatus 10. The beacon pole 45 further comprises a strobe light 50 thereat an upper end portion which provides flashing illumination 52 to aid in location of a user in an emergency situation. The beacon pole 45 is illustrated here in a horizontal and stored position being secured using a tubular retaining clip 58 also mounted thereto or molded thereinto the top surface of the housing 15. The beacon pole 45 is envisioned being made of similar materials as the aforementioned housing 15.

The apparatus 10 further comprises a charge control panel 60, a plurality of output jacks 65, a 120 VAC outlet 75, and an auxiliary DC jack 77 on a long side portion of the housing 15. The charge control panel 60 provides a digital display of various alphanumeric information received therefrom the internal solar charge controller 90 such as, but not limited to: charge level of the battery 95, solar panel 25 power generation level (Watts), operational status of the apparatus 10, operating mode information, and the like. The solar charge controller 90 conditions and directs electrical power received therefrom the solar array panel 25, thereto the rechargeable battery 95 (see FIGS. 3 and 4). The output jacks 65 provide various standard voltages to power small electrical devices 80, 85 such as six (6) volts, nine (9) volts, twelve (12) volts, and the like. Each output jack 65 is controlled via an adjacent and corresponding two-position sliding ON/OFF switch 70 to eliminate occurrences of parasitic power losses should there be no electrical device 80, 85 plugged into the respective output jacks 65. Said output jacks 65 preferably comprise one (1) or more standard circular six (6) volt jacks, one (1) or more standard circular nine (9) volt jacks, one (1) or more standard circular twelve (12) volt jacks, and one (1) or more standard USB jacks. However, the exact arrangement, voltages, and quantity of the output jacks 65 are not intended to be a limiting factor of the apparatus 10 and may vary based upon specific anticipated usage. Typical output jacks 65 are envisioned to include various DC voltages suitable to operate such devices as personal music players, computers, USB operated devices, and the like. The 120 VAC outlet 75 provides an alternating current thereto 120 VAC powered devices 85 which draw a lower level of power such as small televisions, low wattage lamps, computers, 120-volt cell phone chargers, and the like. The auxiliary DC jack 77 provides 12-volt DC power from the rechargeable battery pack 95 to power appropriate electrical devices 80 or may also be used to "daisy-chain" multiple units of the apparatus 10 together if desired (see FIG. 4).

Figure 2:
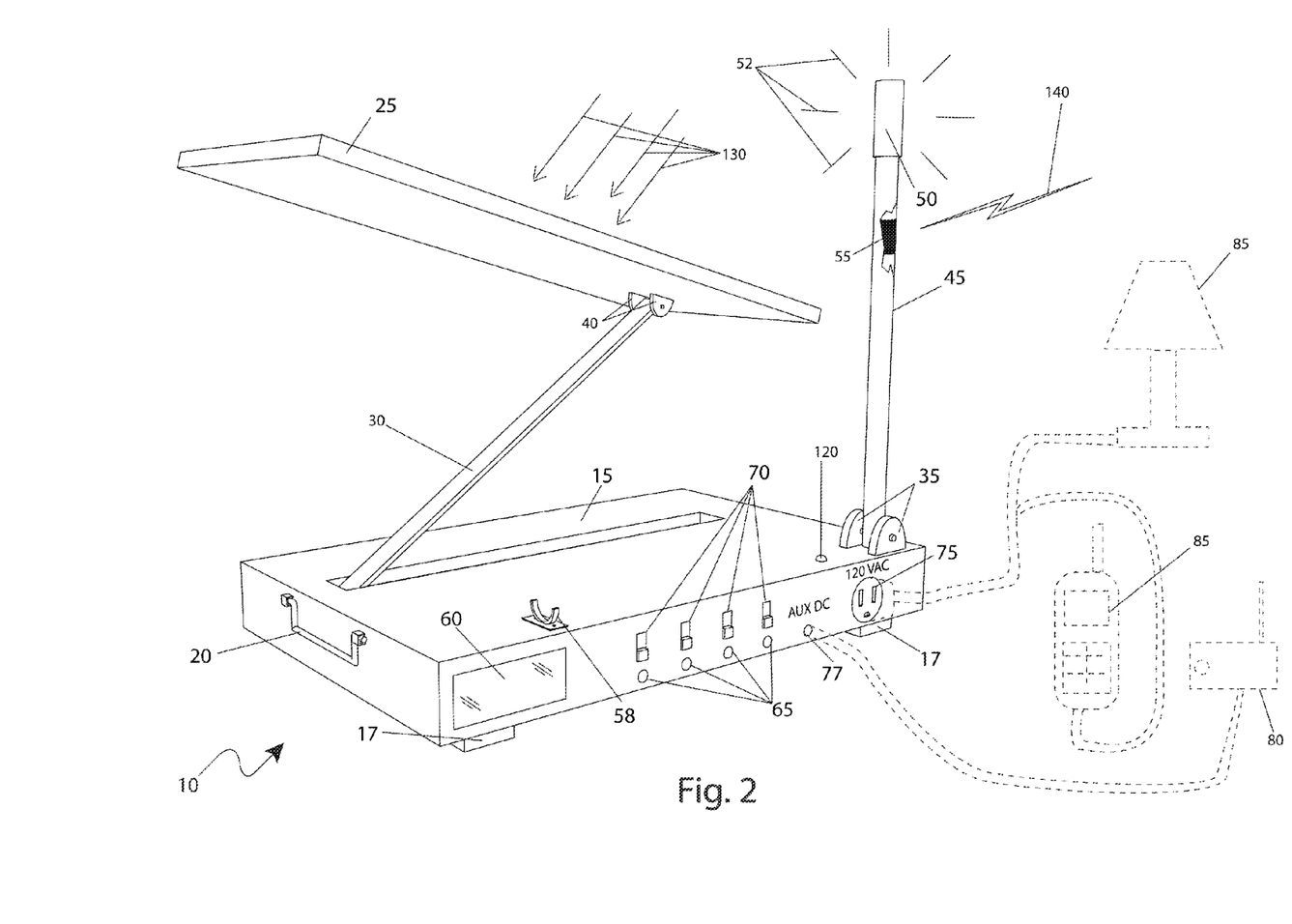
FIG. 2 is a perspective view of the portable power generating unit 10, shown in a partially deployed or utilized configuration, according to the preferred embodiment of the present invention.

Referring next to FIG. 2, a perspective view of the apparatus 10, shown in a deployed or utilized configuration, according to the preferred embodiment of the present invention, is disclosed. The apparatus 10 is illustrated here depicting a raised and operating condition of the solar array panel 25 and the beacon pole 45. The elevating and adjustable arm 30 attached thereto the housing 15 via a second hinged joint 40 molded or fastened thereto a central portion of a lower surface of the solar array panel 25, and by a third hinged joint 47 affixed thereto a recessed molded-in arm storage slot portion 32 of the housing 15 (see FIG. 3). The second 40 and third 47 hinged joints comprise similar construction as the aforementioned first hinged joint 35 also providing a slight resistance to motion, thereby retaining the solar panel array 25 in position following manual positioning. Said second 40 and third 47 hinged joints allow the solar array panel 25 to be raised and angled to efficiently receive solar rays 130 and thus capture a maximum amount of solar energy to facilitate electrical production of the solar cells 27. The second 40 and third 47 hinged joints work in conjunction with the arm 30 allowing the solar array panel 25 to be positioned virtually anywhere from a near horizontal to a near vertical orientation. This configuration allows the solar array panel 25 to be positioned in a perpendicular manner thereto incoming solar rays 130. The optimum positioning of the solar array panel 25 may be verified by viewing power production data which is displayed thereupon the charge control panel 60 during manual alignment of the solar array panel 25, thereby providing maximum charging current thereto the internal battery back 95 (see FIGS. 3 and 4). It should be noted that as the sun moves across the sky, periodic realignment of the solar array panel 25 may be necessary to allow for maximum production of a charging current.

When the beacon pole 45 is raised, a beacon switch 120 is exposed which provides coincidental push-button activation of a strobe light 50 and an emergency signal 140 therefrom an internal PLB 55. The PLB 55 provides wireless communication with an established satellite-based location and rescue system utilized by outdoor enthusiasts during emergency situations. The technology and use of the PLB 55 is well-known in the art and is intended to utilize a COSPAS-SAR-SAT satellite notification system in a similar manner as other conventional PLB's. The operation of the beacon pole 45 is intended for use by a user in an emergency situation where rescue communications are needed.

The apparatus 10 is depicted here utilizing an electrical device 80 being connected thereto an output jack 65 having an appropriate voltage. The electrical device 80 is depicted here as a transistor radio for purposes of illustration; however, any low power DC electronic device may be powered in like manner. Additionally, a 120 VAC powered device 85 is shown here connected to the 120 VAC outlet 75. The 120 VAC powered device 85 is depicted as a lamp or cellular phone charger for purposes of illustration, although various other low power 120 VAC devices 85 may be powered as well, and as such should not be interpreted as a limiting factor of the apparatus 10.

Figure 3:
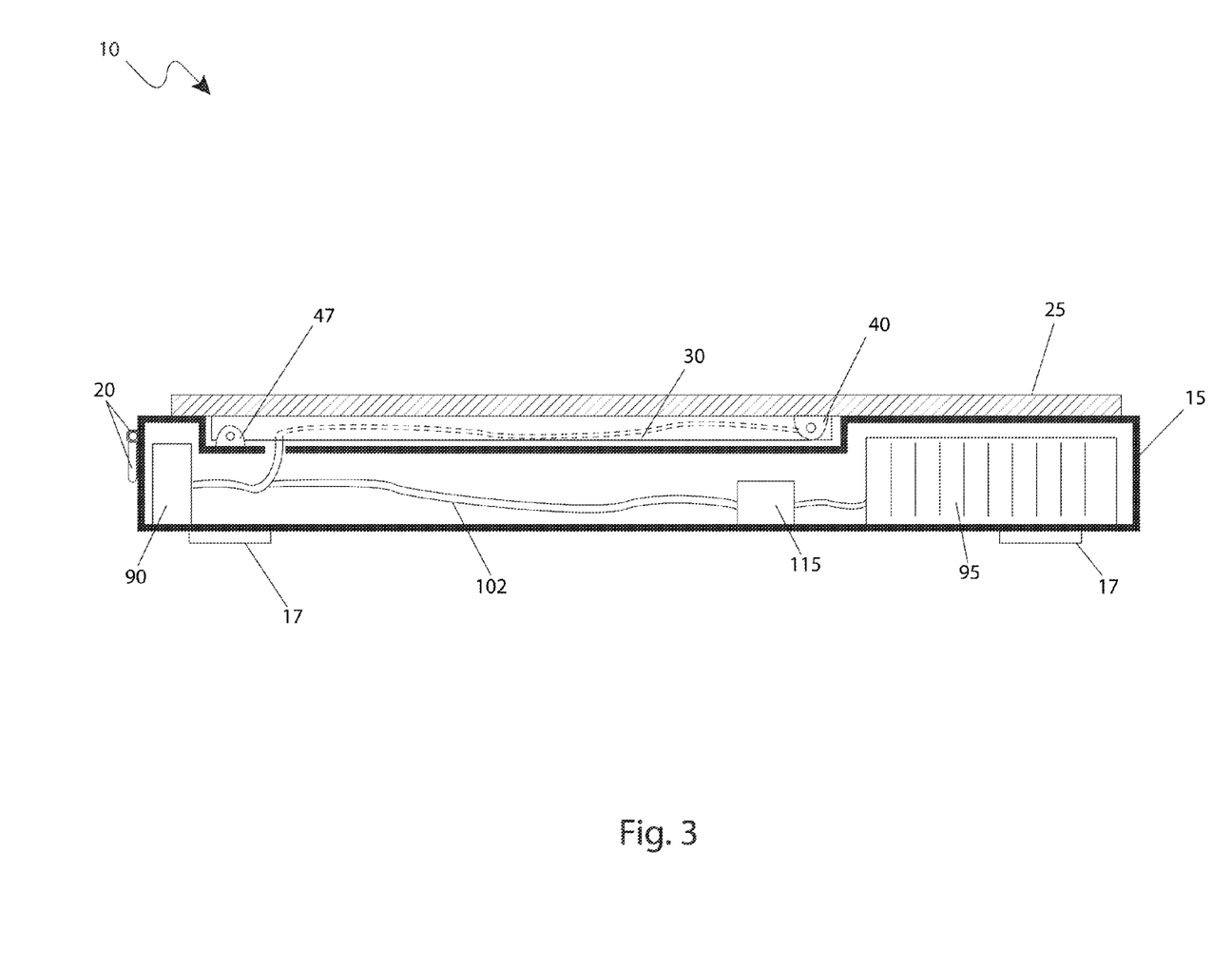
FIG. 3 is a section view of the portable power generating unit 10 along section line A-A (see FIG. 1), according to the preferred embodiment of the present invention; and, FIG. 4 is an electrical block diagram depicting the major electrical components of the portable power generating unit 10, according to the preferred embodiment of the present invention.

Referring now to FIG. 3, a section view of the portable power generating unit 10 along section line A-A (see FIG. 1), according to the preferred embodiment of the present invention, is disclosed. The housing 15 comprises a hollow interior space providing a protective attachment means thereto electrical and electronic equipment necessary thereto the operation of the apparatus 10 including a solar charge controller 90, a rechargeable battery pack 95, and a DC to 120 VAC inverter 115. The solar array panel 25 produces a variable voltage current which is conducted via common wiring 102 therefrom said solar array panel 25, through the arm 30, and routed thereto the solar charge controller 90 located within the housing 15. The solar charge controller 90 is well-known in the art and is used as part of the apparatus 10 in its conventional and normal application. The solar charge controller 90 provides a regulation means thereto received power, thereby providing a constant twelve (12) volts DC thereto the rechargeable battery pack 95 and the DC to 120 VAC inverter 115 (see FIG. 4).

The housing 15 also comprises four (4) rubber feet 17 which provide an anti-skidding and stabilizing means thereto the apparatus 10. Said feet 17 are envisioned to be located at bottom corner locations of said housing 15 being affixed thereto using a common fastening means such as adhesives, hardware fasteners, or the like.

Figure 4:
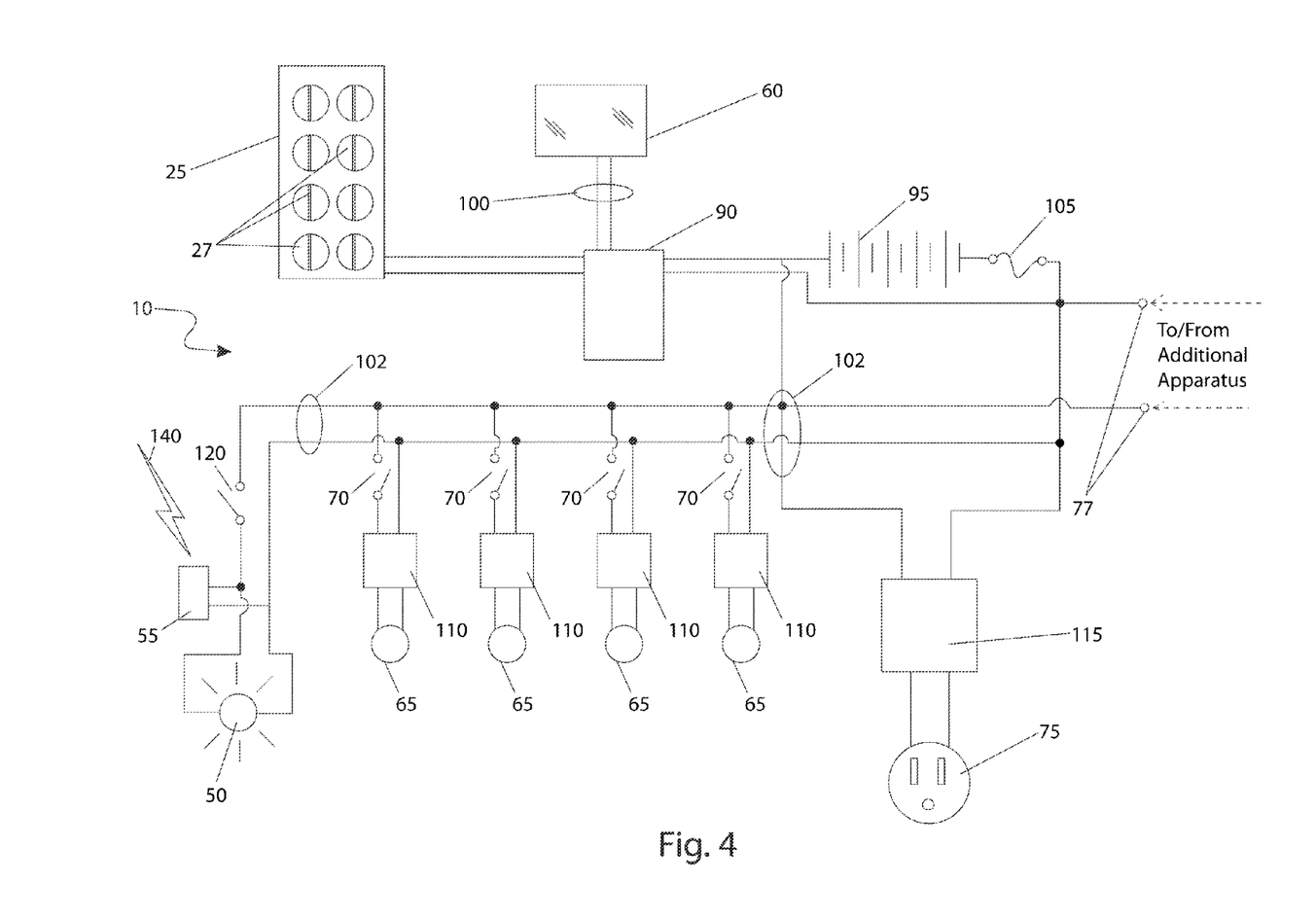

Referring now to FIG. 4, an electrical block diagram depicting the major electrical components of the apparatus 10, according to the preferred embodiment of the present invention, is disclosed. Electric power from the solar array panel 25 is routed thereto the solar charge controller 90. Said solar charge controller 90 is used to control a rate of charging current delivered from the solar array panel 25 to the rechargeable battery pack 95. In periods of excessive solar rays 130, the solar charge controller 90 limits power flow, and during periods of low or diminished sunlight, the solar charge controller 90 provides a proper voltage at a diminished charge rate to continue to provide a "trickle charge" thereto the rechargeable battery pack 95. The solar charge controller 90 is interfaced to the charge control panel 60 via a multiple-conductor control cable 100. The solar charge controller 90 provides an output signal to communicate a power level as received therefrom the solar array panel 25 thereto said charge control panel 60. The charge control panel 60 in turn provides numeric digital display of said power level allowing a user to monitor electrical power produced by the apparatus 10 as well as aid in positioning the solar array panel 25 toward the sun to optimize electricity production.

Electric current from the rechargeable battery pack 95 is routed through an overcurrent protection device 105 such as a fuse, to prevent accidental short circuits. Said power is then provided thereto the output jacks 65 being routed through respective on/off switches 70 and voltage regulators 110. The voltage regulators 110 comprise common components which produce an appropriate output voltage for each respective output jack 65. For example, a 5-volt regulated output jack 65 would be provided for a USB charging jack. As previously described, the exact voltage, current, and configuration of each voltage regulator 110 and respective output jack 65 is not intended to be a limiting factor of the apparatus 10 and would be dictated by individual user's needs.

Power from the rechargeable battery pack 95 is also routed through the DC to 120 VAC inverter 115 with the resultant 120 VAC power being routed to the 120 VAC outlet 75. The DC to 120 VAC inverter 115 is envisioned to be a common commercially available unit which is well known in the art. The AC power output is envisioned to be approximately 400 Watts; however said current would be varied per the specific user requirements. DC power is also conducted therefrom said battery pack 95 thereto the auxiliary DC jack 77 to provide 12-volt DC power to appropriate connected electrical devices 80 or may also be used to "daisy-chain" multiple units of the apparatus 10 together if desired.

Finally, DC power from the rechargeable battery pack 95 is routed through a pushbutton type beacon switch 120 which is located at the base of the beacon pole 45 (see FIG. 2). When rotated thereto an upright position, the beacon switch 120 is exposed and ready for manual simultaneous activation of the strobe light 50 and the PLB 55 to summon emergency help. Said beacon switch 120 is envisioned to be a flush-mounted "push on-push off" type device being mounted therealong an upper surface of the housing 15.

It is envisioned that other styles and configurations of the present invention can be easily incorporated into the teachings of the present invention, and only one particular configuration shall be shown and described for purposes of clarity and disclosure and not by way of limitation of scope.

The preferred embodiment of the present invention can be utilized by the common user in a simple and effortless manner with little or no training. It is envisioned that the apparatus 10 would be constructed in general accordance with FIGS. 1 through 3.

The method of installing and utilizing the apparatus 10 may be achieved by performing the following steps: providing an initial charge of the rechargeable battery pack 95 by elevating and orientating the solar array panel 25 towards the sun using the second 40 and third 47 hinged joint portions of the arm 30; rotating the apparatus 10 and manipulating the arm 30 so as to align the solar array panel 25 perpendicularly with available solar rays 130; verifying maximization of a resultant charging current by viewing the charge control panel 60; allowing a sufficient period of time to pass until the rechargeable battery pack 95 is at a maximum charge as observed on the charge control panel 60; utilizing the stored electrical power within the apparatus 10 during a time when the user is without commercial power or simply wishes to utilize solar power; activating one (1) or more output jacks 65 by turning on the respective ON/OFF switches 70; plugging in an electrical device 80 having a suitable power cord, into an appropriate output jack 65 where it will operate as though plugged into a conventional power source; plugging a 120 VAC powered device 85 thereinto the 120 VAC outlet 75 to provide operation as though plugged into a conventional household power outlet; utilizing the apparatus 10 in the case of emergency conditions where assistance is required by positioning the solar array panel 25 as previously described; pivoting the beacon pole 45 thereto a vertical position; pressing the beacon switch 120, thereby activating the strobe light 50 and the PLB 55; transmitting an emergency signal 140 on a given frequency and predetermined response protocol used with conventional PLB's; being located by rescuers via the emergency signal 140; using the strobe light 50 to aid in final location of those requiring assistance; transporting the apparatus 10 upon completion of usage, using the handle 20 in an expected manner; pivoting the beacon pole downwardly until secured using the retaining clip 58; positioning the solar array panel 25 compactly against the housing 15; storing the apparatus 10 until needed again; and, benefiting from the operation of various electrical devices 80, 85 using a compact portable power apparatus 10 as well as benefiting from the emergency rescue features of the present invention 10.

The foregoing descriptions of specific embodiments of the present invention have been presented for purposes of illustration and description. They are not intended to be exhaustive or to limit the invention and method of use to the precise forms disclosed. Obviously many modifications and variations are possible in light of the above teaching. The embodiment was chosen and described in order to best explain the principles of the invention and its practical application, and to thereby enable others skilled in the art to best utilize the invention and various embodiments with various modifications as are suited to the particular use contemplated. It is understood that various omissions or substitutions of equivalents are contemplated as circumstance may suggest or render expedient, but is intended to cover the application or implementation without departing from the spirit or scope of the claims of the present invention.

What is claimed is:

1. A portable power generating unit for operating electrical devices for extended periods of time, said portable power generating unit comprising:
   a housing;
   an adjustable arm pivotally attached to said housing;
   a solar array panel including a plurality of solar cells, said solar array panel being mounted to said adjustable arm and further being angularly adjusted and thereby adapting said solar cells to maximum exposure of sunlight, said solar array panel producing a variable voltage current;
   an internal rechargeable battery pack located within said housing and being charged by said solar cells;
   an internal solar charge controller located inside said housing and electrically coupled to said solar array panel as well as said rechargeable battery pack;
   a charge control panel electrically coupled to said solar charge controller, wherein electric power from said solar array panel is routed to said solar charge controller, said solar charge controller controlling a rate of charging current delivered from said solar array panel to said rechargeable battery pack;
   a plurality of output jacks electrically coupled to said rechargeable battery pack, each of said output jacks providing a unique direct current (DC) output, wherein one of said output jacks is an auxiliary DC output jack;
   an alternating current (AC) inverter located inside said housing and electrically coupled to said rechargeable battery pack;
   an AC outlet electrically coupled to said AC inverter, said AC inverter supplying a 120-volt alternating current to said AC outlet; and,
   a plurality of voltage regulators electrically coupled to said output jacks respectively;
   wherein said solar array panel is positioned along an exterior upper face of said housing, said housing comprises:
      a hinged handle mounted to said housing;
      a beacon pole located on said upper face of said housing and positioned adjacent to said solar array panel;
      a first hinged joint pivotally connecting said beacon pole to said housing such that said beacon pole is pivotal between a stored flat position against said housing and an upward position at a right angle to said housing;
      a second hinged joint pivotally attaching said adjustable arm to a central portion of a lower surface of said solar array panel;
      a recessed arm storage slot formed in said housing; and,
      a third hinged joint affixed to said recessed arm storage slot and said adjustable arm respectively;
   wherein said second and third hinged joints maintain said adjustable arm at a desired position and thereby allow said solar array panel to be angled at a desired position;
   wherein each of said second and third hinged joints is positioned within said recessed arm storage slot when said solar array panel is lowered to a substantially horizontal orientation relative to said exterior upper surface of said housing; and,
   wherein said solar array panel is registered parallel to said exterior upper surface of said housing and directly engages said exterior upper surface of said housing when said second and third hinged joints are positioned within said recessed arm storage slot.

2. The portable power generating unit of claim 1, wherein said beacon pole comprises:
   a strobe light located at an upper end portion of said beacon pole to help locate a user in an emergency situation; and,
   a tubular retaining clip attached to a top surface of said housing and thereby maintaining said beacon pole at a substantially stable stored flat position.

3. The portable power generating unit of claim 1, wherein said charge control panel provides a digital display of alphanumeric information received from said internal solar charge controller, said alphanumeric information including a charge level of said rechargeable battery pack, a solar array panel power level, and an operational status of said portable power generating unit.

4. The portable power generating unit of claim 3, wherein said solar charge controller is interfaced to said charge control panel;
   wherein said solar charge controller provides an output signal to communicate a power level of said solar array panel to said charge control panel;
   upon receipt of said solar array panel power level, said charge control panel provides numeric digital display of said power level.

5. The portable power generating unit of claim 1, wherein each of said output jacks comprises:
   a two-position sliding on/off switch; and,
   at least one jack selected from a group including a 6-volt AC jack, a 9-volt AC jack, a 12-volt AC jack, and a USB jack.

6. The portable power generating unit of claim 1, wherein said second and third hinged joints work in conjunction with said adjustable arm and thereby position said solar array panel between substantially horizontal and substantially vertical orientations respectively.

7. The portable power generating unit of claim 1, further comprising:
   a beacon switch located at said top surface of said housing and being exposed when said beacon pole is raised;
   wherein said beacon pole generates and transmits a wireless emergency signal when said beacon switch is activated.

8. A portable power generating unit for operating electrical devices for extended periods of time, said portable power generating unit comprising:
   a housing;
   an adjustable arm pivotally attached to said housing;
   a solar array panel including a plurality of solar cells, said solar array panel being mounted to said adjustable arm and further being angularly adjusted and thereby adapting said solar cells to maximum exposure of sunlight, said solar array panel producing a variable voltage current;
   an internal rechargeable battery pack located within said housing and being charged by said solar cells;
   an internal solar charge controller located inside said housing and electrically coupled to said solar array panel as well as said rechargeable battery pack;
   a charge control panel electrically coupled to said solar charge controller, wherein electric power from said solar array panel is routed to said solar charge controller, said solar charge controller controlling a rate of charging current delivered from said solar array panel to said rechargeable battery pack;

a plurality of output jacks electrically coupled to said rechargeable battery pack, each of said output jacks providing a unique direct current (DC) output, wherein one of said output jacks is an auxiliary DC output jack;

an alternating current (AC) inverter located inside said housing and electrically coupled to said rechargeable battery pack;

an AC outlet electrically coupled to said AC inverter, said AC inverter supplying a 120-volt alternating current to said AC outlet; and, a plurality of voltage regulators electrically coupled to said output jacks respectively;

wherein said solar charge controller conditions said variable voltage current to a constant 12-volt DC that is directed to one of said output jacks;

wherein said solar charge controller conditions said variable voltage current to said AC inverter that directs said 120-volt AC to said AC outlet;

wherein a DC output is conducted from said rechargeable battery pack to said auxiliary DC jack and thereby provides a 12-volt DC power;

wherein, in periods of excessive sunlight, said solar charge controller limits power flow to said rechargeable battery pack;

wherein during periods of low sunlight, said solar charge controller provides a voltage at a diminished charge rate to said rechargeable battery pack;

wherein said solar array panel is positioned along an exterior upper face of said housing, said housing comprises:
  a hinged handle mounted to said housing;
  a beacon pole located on said upper face of said housing and positioned adjacent to said solar array panel;
  a first hinged joint pivotally connecting said beacon pole to said housing such that said beacon pole is pivotal between a stored flat position against said housing and an upward position at a right angle to said housing;
  a second hinged joint pivotally attaching said adjustable arm to a central portion of a lower surface of said solar array panel;
  a recessed arm storage slot formed in said housing; and,
  a third hinged joint affixed to said recessed arm storage slot and said adjustable arm respectively;

wherein said second and third hinged joints maintain said adjustable arm at a desired position and thereby allow said solar array panel to be angled at a desired position;

wherein each of said second and third hinged joints is positioned within said recessed arm storage slot when said solar array panel is lowered to a substantially horizontal orientation relative to said exterior upper surface of said housing; and, wherein said solar array panel is registered parallel to said exterior upper surface of said housing and directly engages said exterior upper surface of said housing when said second and third hinged joints are positioned within said recessed arm storage slot.

9. The portable power generating unit of claim 8, wherein said beacon pole comprises:
  a strobe light located at an upper end portion of said beacon pole to help locate a user in an emergency situation; and,
  a tubular retaining clip attached to a top surface of said housing and thereby maintaining said beacon pole at a substantially stable stored flat position.

10. The portable power generating unit of claim 8, wherein said charge control panel provides a digital display of alphanumeric information received from said internal solar charge controller, said alphanumeric information including a charge level of said rechargeable battery pack, a solar array panel power level, and an operational status of said portable power generating unit.

11. The portable power generating unit of claim 10, wherein said solar charge controller is interfaced to said charge control panel;
  wherein said solar charge controller provides an output signal to communicate a power level of said solar array panel to said charge control panel;
  upon receipt of said solar array panel power level, said charge control panel provides numeric digital display of said power level.

12. The portable power generating unit of claim 8, wherein each of said output jacks comprises:
  a two-position sliding on/off switch; and,
  at least one jack selected from a group including a 6-volt AC jack, a 9-volt AC jack, a 12-volt AC jack, and a USB jack.

13. The portable power generating unit of claim 8, wherein said second and third hinged joints work in conjunction with said adjustable arm and thereby position said solar array panel between substantially horizontal and substantially vertical orientations respectively.

14. The portable power generating unit of claim 8, further comprising:
  a beacon switch located at said top surface of said housing and being exposed when said beacon pole is raised;
  wherein said beacon pole generates and transmits a wireless emergency signal when said beacon switch is activated.

15. A method of utilizing a portable power generating unit for operating electrical devices for extended periods of time, said method comprising the steps of:
  providing a housing;
  providing and pivotally attaching an adjustable arm to said housing;
  providing a solar array panel including a plurality of solar cells;
  mounting said solar array panel to said adjustable arm;
  angularly adjusting said solar array panel and thereby adapting said solar cells to maximum exposure of sunlight;
  providing and locating an internal rechargeable battery pack within said housing, said rechargeable battery pack being charged by said solar cells;
  providing and locating an internal solar charge controller inside said housing;
  electrically coupling said solar charge controller to said solar array panel as well as said rechargeable battery pack;
  providing and electrically coupling a charge control panel to said solar charge controller;
  providing and electrically coupling a plurality of output jacks to said rechargeable battery pack;
  providing and locating an alternating current (AC) inverter inside said housing;
  electrically coupling said AC inverter to said rechargeable battery pack;
  providing and electrically coupling an AC outlet to said AC inverter;
  providing and electrically coupling a plurality of voltage regulators to said output jacks respectively;
  said solar array panel producing a variable voltage current;

routing electric power from said solar array panel to said solar charge controller;

said solar charge controller controlling a rate of charging current delivered from said solar array panel to said rechargeable battery pack;

said solar charge controller conditioning said variable voltage current to a constant 12-volt DC that is directed to one of said output jacks;

said AC inverter supplying a 120-volt alternating current to said AC outlet;

said solar charge controller conditioning said variable voltage current to said AC inverter that directs said 120-volt AC to said AC outlet;

providing a 12-volt DC power by conducting a DC output from said rechargeable battery pack to said auxiliary DC jack;

in periods of excessive sunlight, said solar charge controller limiting power flow to said rechargeable battery pack;

during periods of low sunlight, said solar charge controller providing a voltage at a diminished charge rate to said rechargeable battery pack; and, each of said output jacks providing a unique direct current (DC) output, wherein one of said output jacks is an auxiliary DC output jack.

* * * * *